US011717915B2

(12) United States Patent
Bray et al.

(10) Patent No.: US 11,717,915 B2
(45) Date of Patent: Aug. 8, 2023

(54) JOINING METHOD (71) Applicant: ROLLS-ROYCE plc, London (GB)

(72) Inventors: Simon E Bray, Derby (GB); Charlotte Gibson, Derby (GB); Gemma A Raven, Royston (GB); Peter A Stevens, Derby (GB)

(73) Assignee: ROLLS-ROYCE PLC, London (GB)

( * ) Notice: Subject to any disclaimer, the term of this patent is extended or adjusted under 35 U.S.C. 154(b) by 314 days.

(21) Appl. No.: 16/900,013

(22) Filed: Jun. 12, 2020

(65) Prior Publication Data
US 2020/0391322 A1 Dec. 17, 2020

(30) Foreign Application Priority Data

Jun. 13, 2019 (GB) .................................. 1908479
Jul. 10, 2019 (GB) .................................. 1909875
Jul. 10, 2019 (GB) .................................. 1909876

(51) Int. Cl.
B23K 20/00 (2006.01)
B23K 20/24 (2006.01)
(Continued)

(52) U.S. Cl.
CPC ............ *B23K 20/24* (2013.01); *B23K 20/002* (2013.01); *B23K 20/12* (2013.01); *B23K 20/121* (2013.01); *B23K 20/126* (2013.01); *B23K 20/129* (2013.01); *C21D 7/06* (2013.01); *F01D 5/066* (2013.01); *F02C 3/107* (2013.01); *B23K 2101/001* (2018.08); *B23K 2103/10* (2018.08);
(Continued)

(58) Field of Classification Search
CPC .... B23K 20/12; B23K 20/129; B23K 20/121; B23K 20/22; B23K 2101/001; B23K 33/006
See application file for complete search history.

(56) References Cited

U.S. PATENT DOCUMENTS 2,542,955 A 2/1951 Young et al.
3,273,233 A 9/1966 Loring et al.
(Continued)

FOREIGN PATENT DOCUMENTS

CN 104772560 A 7/2015
EP 2 168 707 A1 3/2010
(Continued)

OTHER PUBLICATIONS

Dec. 3, 2020 Search Report issued in European Patent Application No. 20178208.3.
(Continued)

*Primary Examiner* — Erin B Saad
(74) *Attorney, Agent, or Firm* — Oliff PLC (57) ABSTRACT A method of friction welding a first component to a second component, the method having the steps of: rotating the first component relative to the second component about a rotation axis; and bringing the first component into contact with the second component; wherein, while the first component and the second component are in contact, a first average force is applied during a first stage of the friction welding process and a second average force is applied during a second stage of the friction welding process; and the second average force is different from the first average force.

12 Claims, 4 Drawing Sheets (51) Int. Cl.
  *B23K 20/12*   (2006.01)
  *F01D 5/06*    (2006.01)
  *C21D 7/06*    (2006.01)
  *F02C 3/107*   (2006.01)
  *B23K 101/00*  (2006.01)
  *B23K 103/10*  (2006.01)
  *B23K 103/14*  (2006.01)

(52) U.S. Cl.
  CPC ...... *B23K 2103/14* (2018.08); *C21D 2221/02* (2013.01)

(56) References Cited

U.S. PATENT DOCUMENTS

| | | | |
|---|---|---|---|
| 3,597,832 | A | 8/1971 | Calton et al. |
| 10,384,302 | B2 * | 8/2019 | March ................. B23K 20/1205 |
| 10,641,159 | B2 * | 5/2020 | Graham .................. F02B 19/16 |
| 2003/0160085 | A1 | 8/2003 | Thach et al. |
| 2006/0013645 | A1 | 1/2006 | Ilyushenko et al. |
| 2006/0034695 | A1 | 2/2006 | Hall et al. |
| 2007/0157447 | A1 | 7/2007 | Prevey |
| 2011/0129347 | A1 | 6/2011 | Schneefeld et al. |
| 2015/0202710 | A1 | 7/2015 | Nakatani et al. |
| 2016/0160863 | A1 | 6/2016 | Roach et al. |
| 2016/0160869 | A1 | 6/2016 | Roach et al. |
| 2016/0187080 | A1 | 6/2016 | Remsburg |
| 2016/0273368 | A1 | 9/2016 | Smarsly et al. |
| 2017/0320159 | A1 | 11/2017 | Lloyd et al. |
| 2018/0029157 | A1 | 2/2018 | Bray et al. |
| 2018/0036834 | A1 * | 2/2018 | Menzinger ........... B23K 20/129 |
| 2018/0209280 | A1 | 7/2018 | Forsdike et al. |
| 2018/0209281 | A1 | 7/2018 | Boswell et al. |
| 2018/0223395 | A1 | 8/2018 | Mourer et al. |
| 2018/0298947 | A1 | 10/2018 | Farthing et al. |
| 2018/0371594 | A1 | 12/2018 | Raghavan et al. |
| 2019/0118307 | A1 | 4/2019 | Wang et al. |
| 2020/0023458 | A1 | 1/2020 | Fujii et al. |
| 2020/0023460 | A1 | 1/2020 | Boswell et al. |
| 2020/0309032 | A1 | 10/2020 | Mason et al. |
| 2022/0025493 | A1 | 1/2022 | Neishi et al. |

FOREIGN PATENT DOCUMENTS

| | | |
|---|---|---|
| EP | 2 987 583 A1 | 2/2016 |
| EP | 3 213 856 A1 | 9/2017 |
| EP | 3 292 939 A1 | 3/2018 |
| GB | 1 093 343 A | 11/1967 |
| GB | 1 382 234 A | 1/1975 |
| GB | 1 556 314 A | 11/1979 |
| GB | 2559325 A | 8/2018 |
| JP | S59-118292 A | 7/1984 |
| JP | S61-86086 A | 5/1986 |
| JP | H06-661 A | 1/1994 |
| JP | 2003-247405 A | 9/2003 |
| JP | 2007-296564 A | 11/2007 |
| SU | 1375423 A1 | 2/1988 |
| SU | 1493424 A1 | 7/1989 |
| WO | 2018/062545 A1 | 4/2018 |
| WO | 2018/168687 A1 | 9/2018 |
| WO | 2019/081760 A1 | 5/2019 |

OTHER PUBLICATIONS

Dec. 4, 2020 Search Report issued in European Patent Application No. 20178211.7.
Oct. 7, 2019 Combined Search and Examination Report issued in Great Britain Patent Application No. 1908479.7.
Oct. 7, 2019 Combined Search and Examination Report issued in Great Britain Patent Application No. 1909876.3.
Oct. 7, 2019 Combined Search and Examination Report issued in Great Britain Patent Application No. 1909875.5.
U.S. Appl. No. 16/899,954, filed Jun. 12, 2020 in the name of Walpole et al.
Sep. 28, 2022 Office Action issued in U.S. Appl. No. 16/899,954.
Feb. 27, 2023 Notice of Allowance issued in U.S. Appl. No. 16/899,954.

* cited by examiner

JOINING METHOD

The present disclosure relates to joining components, for example using friction welding.

Friction welding is a process for welding components together that does not require melting. Heat is generated as a result of friction between the components when one is moved relative to another while they are pressed together, resulting in the components fusing together. The use of friction welding techniques may be particularly useful in aerospace applications, for example in the formation of parts of a gas turbine engine, because it facilitates the joining components formed from dissimilar materials. Traditional welding techniques may not be suitable when two materials have a wide difference in melting point.

However, there can be difficulties in the use of friction welding for some materials that are desirable for use in gas turbine engines because the materials may be resistant to flow at high temperatures and thus require large amounts of energy to soften them sufficiently for friction welding. It may therefore be desirable to provide an improved process for joining two components together.

According to a first aspect there is provided a method of friction welding a first component to a second component, the method comprising the steps of: rotating the first component relative to the second component about a rotation axis; and bringing the first component into contact with the second component; wherein, while the first component and the second component are in contact, a first average force is applied during a first stage of the friction welding process and a second average force is applied during a second stage of the friction welding process; and the second average force is different from the first force.

The second average force may be greater than the first average force.

The second average force may be less than the first average force.

The force may change at a constant rate during the second stage.

The force during the second stage may be dependent on the position of the first component relative to the second component in a direction parallel to the rotation axis.

The initiation and/or termination of the second stage may be dependent on the position of the first component relative to the second component in a direction parallel to the rotation axis.

The initiation and/or termination of the second stage may be dependent on the rotation speed of the first component relative to the second component.

The start and/or end of the second stage may be dependent on a predetermined time after contact between the first component and the second component.

The second stage may be initiated after the first component has stopped rotating relative to the second component.

A contact surface of at least one of the first component and the second component may comprise a tapered region that is at least partially incorporated into the weld.

The initiation of the second stage may take place before the tapered region is fully incorporated into the weld.

The rotation speed of the first component relative to the second component may decrease during the first stage.

The rotation speed of the first component relative to the second component may be constant during the first stage.

According to a second aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft, wherein: the gas turbine engine comprises two components that have been joined by the method of any one of the preceding claims.

The turbine may be a first turbine, the compressor may be a first compressor, and the core shaft may be a first core shaft; the engine core may further comprise a second turbine, a second compressor, and a second core shaft connecting the second turbine to the second compressor; and the second turbine, second compressor, and second core shaft may be arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1} K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105

Nkg$^{-1}$ s, 100 Nkg$^{-1}$ s, 95 Nkg$^{-1}$ s, 90 Nkg$^{-1}$ s, 85 Nkg$^{-1}$ s or 80 Nkg$^{-1}$ s. The specific thrust may be in an inclusive range bounded by any two of the values in the previous sentence (i.e. the values may form upper or lower bounds), for example in the range of from 80 Nkg$^{-1}$ s to 100 Nkg$^{-1}$ s, or 85 Nkg$^{-1}$ s to 95 Nkg$^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
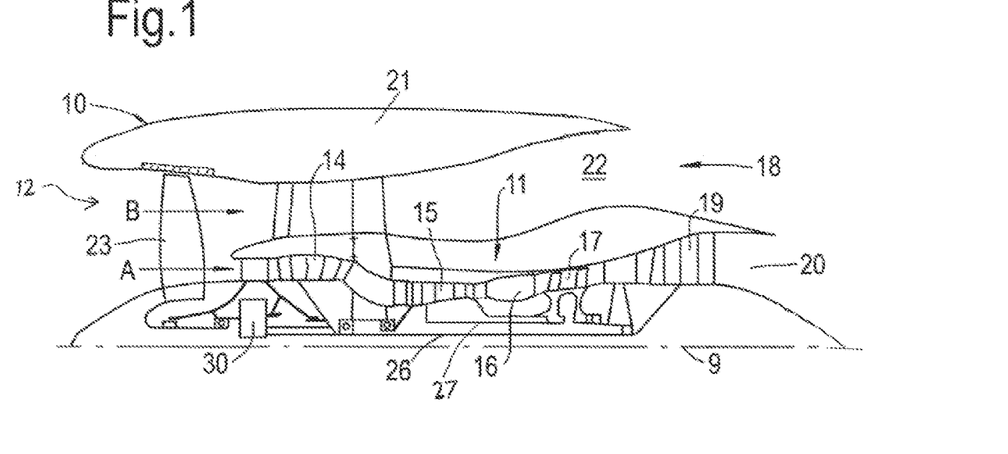
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
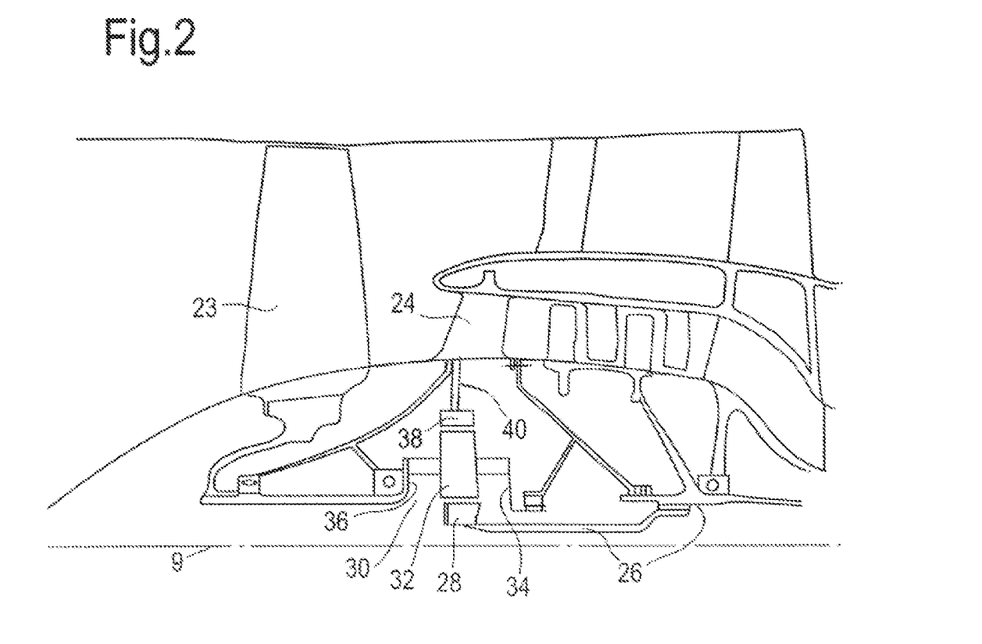
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
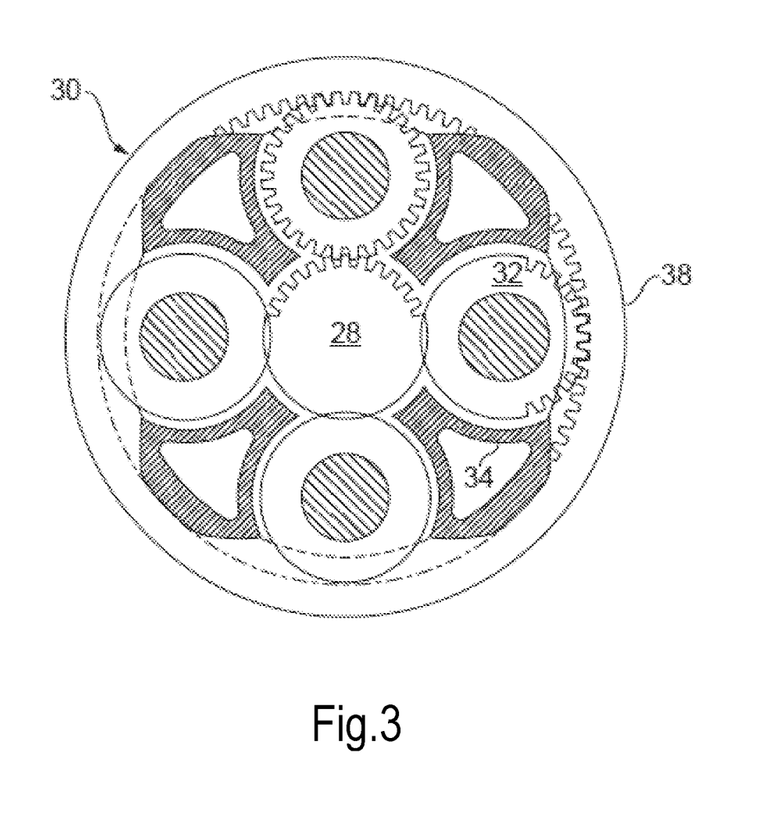
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Two components, for example to be used in a gas turbine engine as discussed above, may be joined together by a friction welding process. The weld may be formed at respective connection surfaces of the two components, namely the surfaces, or part of a surface, at which the two components are joined. Any number of components may be joined together in this way.

Figure 4A:
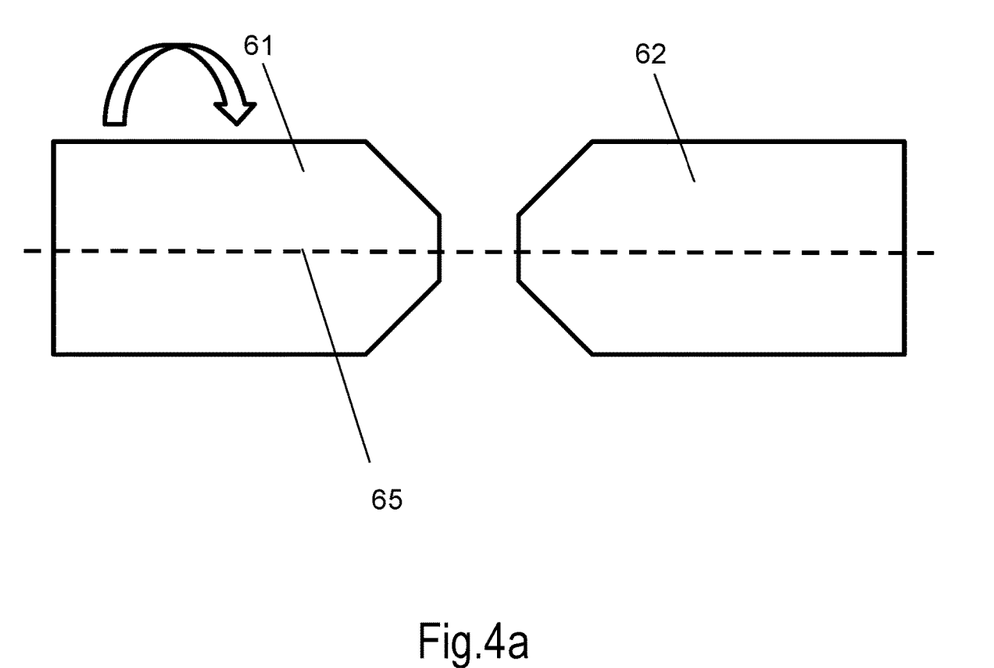
FIGS. 4a and 4b are schematic examples of a rotary friction welding process.

FIG. 4a shows an example of a friction welding process, in particular a rotary friction welding process. In the rotary friction welding process, a first component 61 is rotated, typically at a high speed. A second component 62 may be held in a fixed position relative to the rotation of the first component 61. The components are subsequently brought together. The first component 61 is rotated around an axis of a rotation 65. The rotation of the first component 61 relative to the second component 62 whilst the components are pressed together generates heat by friction, resulting in fusing of the two components. The apparatus rotating the first component 61 relative to the second component 62 may include a flywheel that stores kinetic energy that is converted to heat energy at the connection surfaces when the components are brought together. Alternatively or additionally, the flywheel may be driven by a motor during the rotary friction welding process.

Figure 4B:
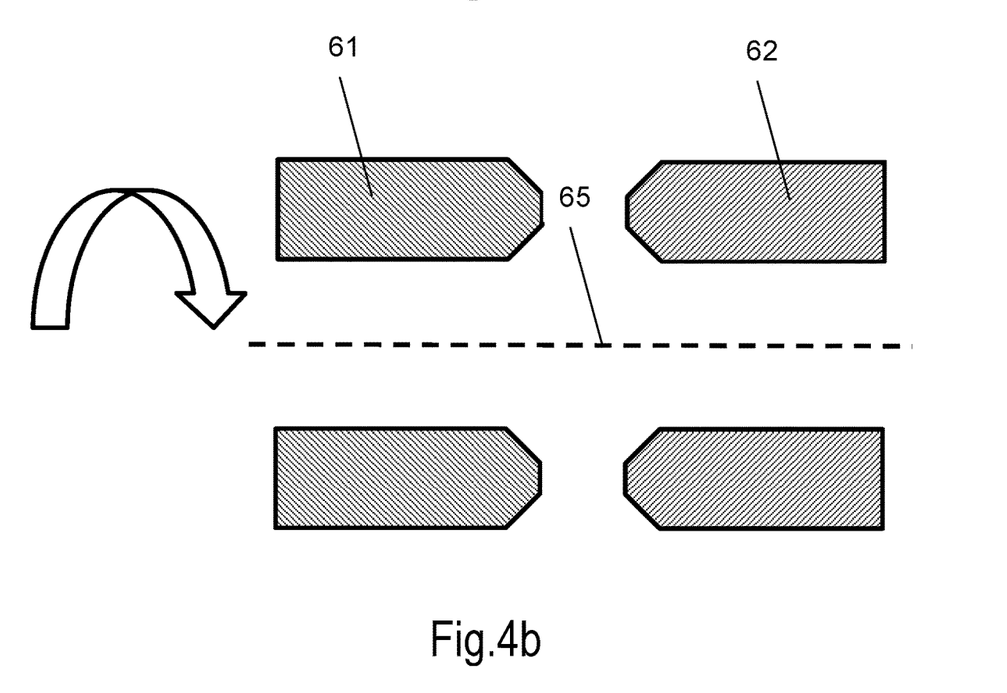

The rotary friction welding process may be performed on solid components and hollow components (such as tubular components). FIG. 4a shows an example of the rotary friction welding process being performed on solid components. FIG. 4b shows an example of the rotary friction welding process being performed on hollow tubular components.

During the rotary friction welding process, hot plasticised material may be expelled radially from the weld interface. This material may be referred to as flash. The removal of this material results in a loss of the axial length of at least one of the first component 61 and the second component 62. This loss may be referred to as upset of the first component 61 and/or the second component 62.

The rotary friction welding process may be performed on components with flat interfaces (in a process referred to as butt welding). Alternatively, at least one of the first component 61 or the second component 62 may comprise a protrusion on the contact surface of the component, where the contact surface is the surface of the component that is brought into contact with the other component during the rotary friction welding process. The protrusion may be formed by at least part of the contact surface of the component comprising a tapered region. The tapered region may be formed by a surface of the component that is arranged at an angle relative to a plane perpendicular to the rotation axis 65. The plane perpendicular to the rotation axis 65 may be defined as the radial axis. The tapered region may be arranged at an angle of 14 degrees to 30 degrees to the radial axis, optionally at 14 degrees to the radial axis.

In the example shown in FIG. 4a, the contact surface of both of the first component 61 and the second component 62 comprises a pair of tapered regions on either side of the rotation axis 65. The contact surface of the component may comprise a plurality of tapered regions, where each of the tapered regions are arranged at a different angle relative to the radial axis. The contact surface of the component may be asymmetric. The contact surface of the first component 61 and the second component 62 may be different. For example, in the case where the contact surface of both of the first component 61 and the second component 62 include a tapered region, the angles of the tapered regions of each component relative to the radial axis may be different from each other. Alternatively or additionally, the lengths of the flat (non-tapered) regions of the contact surfaces in the radial direction may be different for each of the components. The length of the flat region may be 0.5 mm to 3 mm, optionally 1 mm or 1.5 mm.

Such a friction welding process may be performed where at least one of the first component 61 and the second component 62 comprises a nickel based superalloy. The superalloy may be produced by powdered metallurgy. A gamma prime content of the alloy may be between about 40% and 60%. The density of the alloy may be between 8.1 g/cm$^3$ and 8.6 g/cm$^3$. The temperature capabilities of the alloy may be between 675° C. and 850° C. The average grain size values of the superalloy at the point at which the components make contact during the rotary friction welding process (also known as the weld lands) may be less than 10 µm for fine grain weld lands and between 16 and 64 µm for coarse grain weld lands.

Post solution heat treatments may be provided prior to the welding process to achieve an appropriate distribution of gamma prime particles. This treatment may comprise heat treating the component for one to eight hours at a temperature between 830 and 870° C. This treatment may be followed by a further treatment for one to eight hours at temperatures between 800 and 830° C. Alternatively, the component may be heat treated for one to eight hours at a temperature of 700 to 830° C. The component may then be heat treated for one to eight hours at a temperature of 700 to 900° C.

During the rotary friction welding process, force may be applied in an axial direction while the first component 61 and the second component 62 are in contact, resulting in a contact pressure between the first component 61 and the second component 62. The applied force may be referred to as a machine load. The overall applied force may be a result of force applied to the first component 61 and/or the second component 62. The applied force may therefore be the resultant force present at the point of contact between the first component 61 and the second component 62 when the surfaces of the first component 61 and the second component 62 are brought into contact.

This applied force may be controlled such that a first average force is applied during a first stage of the rotary friction welding process and a second average force is applied during a second stage of the rotary friction welding process, where the second average force is different from the first force. The average force during a stage of the process may be determined by summing the instantaneous force applied during each time step of a stage and dividing by the number of time steps within the stage.

Figure 5:
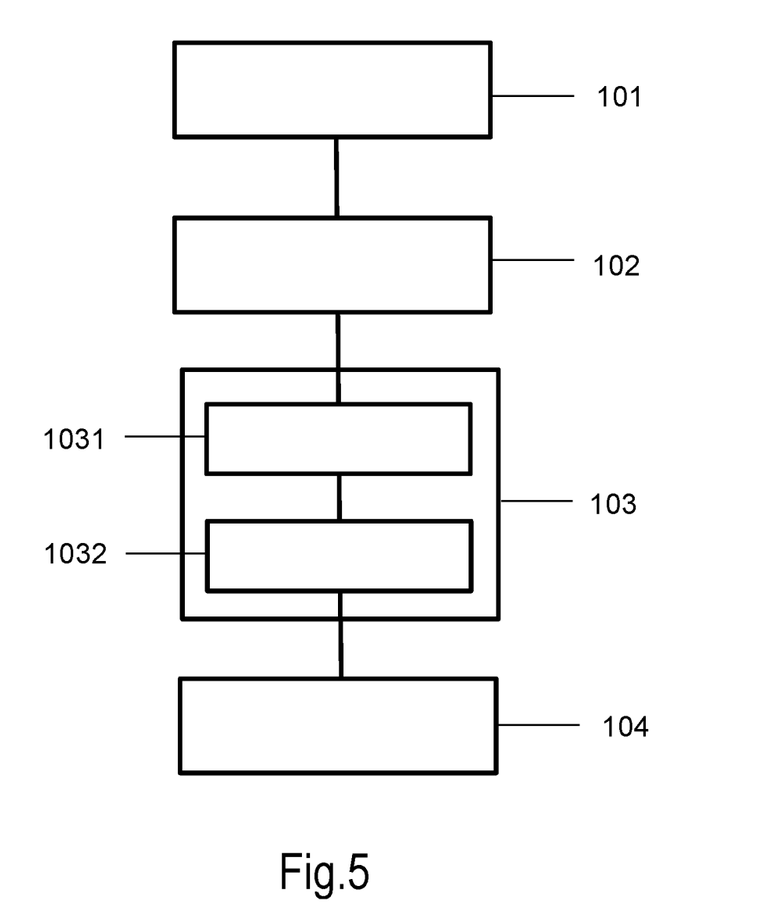
FIG. 5 is a flow diagram representing the steps in an exemplary rotary friction welding process.

An example of such a rotary friction welding process is shown in FIG. 5. In a first step 101, the first component 61 is rotated relative to the second component 62 about the rotation axis 65. In a second step 102, the first component 61 is brought into contact with the second component 62. During a third step 103, the applied force between the first component and the second component is varied. In particular, in a first stage 1031 a first average force is applied and in a second stage 1032 a second average force is applied. Finally, in a fourth step 104, the rotary friction welding process ends with the first component 61 and the second component 62 formed into a welded component. By varying the average force between the first and the second stage, the formation of undesirable bond-line features of the welded component may be reduced.

The second average force may be greater than the first average force. For example, the first component 61 may be brought into contact with the second component 62 at a first constant force. At the initiation of the second stage 1032, the force may be changed to an increased force which is maintained until the rotational friction welding process is completed.

Alternatively, the second average force may be less than the first average force. The average applied force in the second stage 1032 may be from 20% greater to 20% less than average applied force in the first stage 1031.

The applied force may be changed at a constant rate during the second stage 1032 until the rotational friction welding process is completed.

The applied force during the second stage 1032 may be dependent on the position of the first component 61 relative to the second component 62 in a direction parallel to the rotation axis. For example, the applied force may be constant during the first stage 1031 and begin increasing with the changing axial position of the first component 61 once the second stage 1032 has been initiated. The applied force during the first stage 1032 may also vary.

The initiation and/or termination of the second stage 1032 may be dependent on at least one of the position of the first component 61 relative to the second component 62 in a direction parallel to the rotation axis and the rotation speed of the first component 61 relative to the second component 62. Alternatively or additionally, the start and/or end of the second stage 1032 may be dependent on a predetermined time after contact between the first component 61 and the second component 62. The behaviour of the force applied may depend on a combination of the conditions described herein. For example, initiation of the second stage 1032 might take place after either a certain time period after the components have come into contact has elapsed or after the rotation speed of the first component 61 drops below a certain value. For example, initiation of the second stage 1032 may take place when the rotation speed of the first component 61 relative to the second component 62 drops below a value of 100 surface feet per minute. Alternatively, initiation of the second stage 1032 might take place only after both of these conditions are satisfied.

The rotary friction welding process may comprise further stages in which the average force varies from at least one of the average force in the first stage 1031 and the second stage 1032. In this case, the first stage 1031 may be the penultimate stage of the rotary friction welding process and the second stage 1032 may be the final stage of rotary friction welding process.

Initiation of the second stage 1032 may take place after the first component 61 has stopped rotating relative to the second component 62. In this case, the differing average force of the second stage 1032 is applied to the welded component. Termination of the second stage 1032 may take place a predetermined time after the end of the rotation of the first component 61 relative to the second component 62.

As discussed above, during the rotational friction welding process, material is expelled from at least one of the first component 61 and the second component 62. When at least one of the first component 61 and the second component 62 comprises a protruding surface, the protruding surface may be destroyed and expelled by the rotational friction welding process such that the join between the first component 61 and the second component 62 forms a continuous surface. This process may begin when the protruding surface first comes into contact with the other component and ends when the protruding surface has been completely consumed into the weld. In the case where at least one of the first component and the second component comprises a contact surface comprising a protrusion such as a tapered region, the initiation of the second stage 1032 may take place before the tapered region is fully incorporated into the weld. Alternatively, the protruding surface may not be fully incorporated into the weld.

The rotation speed of the first component 61 relative to the second component 62 may decrease during the first stage 1031. For example, the rotational friction welding process may be an inertial rotational friction welding process. Alternatively, the rotation speed of the first component 61 relative to the second component 62 may be constant during the first stage 1031. For example, the rotational friction welding process may be a continuous drive rotational friction welding process.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of friction welding a first component to a second component, the method comprising the steps of:
    rotating the first component relative to the second component about a rotation axis; and
    bringing the first component into contact with the second component;
    wherein, while the first component and the second component are in contact, a first average force is applied during a first stage of the friction welding process and a second average force is applied during a second stage of the friction welding process, wherein force applied during the second stage changes at a constant rate until the friction welding process is complete;
    the second average force is different from the first force; and the rotation speed of the first component relative to the second component decreases during the first stage.

2. The method of claim 1, wherein the second average force is greater than the first average force.

3. The method of claim 1, wherein the second average force is less than the first average force.

4. The method of claim 1, wherein the force applied during the second stage is dependent on the position of the first component relative to the second component in a direction parallel to the rotation axis.

5. The method of claim 1, wherein the initiation and/or termination of the second stage is dependent on the position of the first component relative to the second component in a direction parallel to the rotation axis.

6. The method of claim 1, wherein the initiation and/or termination of the second stage is dependent on the rotation speed of the first component relative to the second component.

7. The method of claim 1, wherein the start and/or end of the second stage is dependent on a predetermined time after contact between the first component and the second component.

8. The method of claim 1, wherein the second stage is initiated after the first component has stopped rotating relative to the second component.

9. The method of claim 1, wherein a contact surface of at least one of the first component and the second component comprises a tapered region that is at least partially incorporated into the weld.

10. The method of claim 9, wherein the initiation of the second stage takes place before the tapered region is fully incorporated into the weld.

11. A method of friction welding a first component to a second component, the method comprising the steps of:
    rotating the first component relative to the second component about a rotation axis; and
    bringing the first component into contact with the second component;
    wherein, while the first component and the second component are in contact, a first average force is applied during a first stage of the friction welding process and a second average force is applied during a second stage of the friction welding process, wherein force applied during the second stage changes at a constant rate until the friction welding process is complete;
    the second average force is different from the first force; and
    the second stage is initiated after the first component has stopped rotating relative to the second component.

12. The method of claim 11, wherein the rotation speed of the first component relative to the second component is constant during the first stage.

* * * * *